United States Patent
Dirndorfer et al.

(10) Patent No.: US 9,159,234 B2
(45) Date of Patent: Oct. 13, 2015

(54) METHOD FOR EMULATING AN ENVIRONMENTAL SENSOR IN A MOTOR VEHICLE AND FOR TESTING AN ANTICIPATORY SAFETY SYSTEM, AND AN EMULATION SYSTEM

(75) Inventors: Tobias Dirndorfer, München (DE); Markus Larice, Karlskron (DE); Michael Botsch, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 842 days.

(21) Appl. No.: 13/411,009

(22) Filed: Mar. 2, 2012

(65) Prior Publication Data
US 2013/0060522 A1   Mar. 7, 2013

(30) Foreign Application Priority Data

Mar. 4, 2011 (DE) .......................... 10 2011 012 961

(51) Int. Cl.
- *G01F 11/30* (2006.01)
- *G08G 1/16* (2006.01)
- *G01M 17/007* (2006.01)

(52) U.S. Cl.
CPC ............. *G08G 1/16* (2013.01); *G01M 17/0078* (2013.01)

(58) Field of Classification Search
CPC ...... G01M 17/0078; G01P 21/02; G01P 3/44; G01P 3/487; G05B 17/02; G06F 11/3409; G01R 17/00
See application file for complete search history.

(56) References Cited

U.S. PATENT DOCUMENTS

| 7,830,805 B2 * | 11/2010 | Cohen et al. .................. 370/241 |
| 2007/0046300 A1 * | 3/2007 | Kay et al. ...................... 324/725 |

FOREIGN PATENT DOCUMENTS

| DE | 199 62 533 | 7/2001 |
| DE | 102005027252 | 12/2006 |
| DE | 102008002243 | 12/2009 |
| EP | 1 998 160 | 12/2008 |

* cited by examiner

*Primary Examiner* — Elias Desta
(74) *Attorney, Agent, or Firm* — Henry M. Feieresen LLC

(57) ABSTRACT

In a method for emulating an environmental sensor in a motor vehicle in a specified collision situation at a first predetermined speed of the motor vehicle, raw data are recorded in a collision situation at a second speed, which is lower than the first speed, with the environmental sensor to be emulated using the motor vehicle and/or a structurally substantially identical motor vehicle and stored. The stored raw data and/or raw data extrapolated therefrom are used downsampled for emulating the environmental sensor at the first speed.

11 Claims, 3 Drawing Sheets

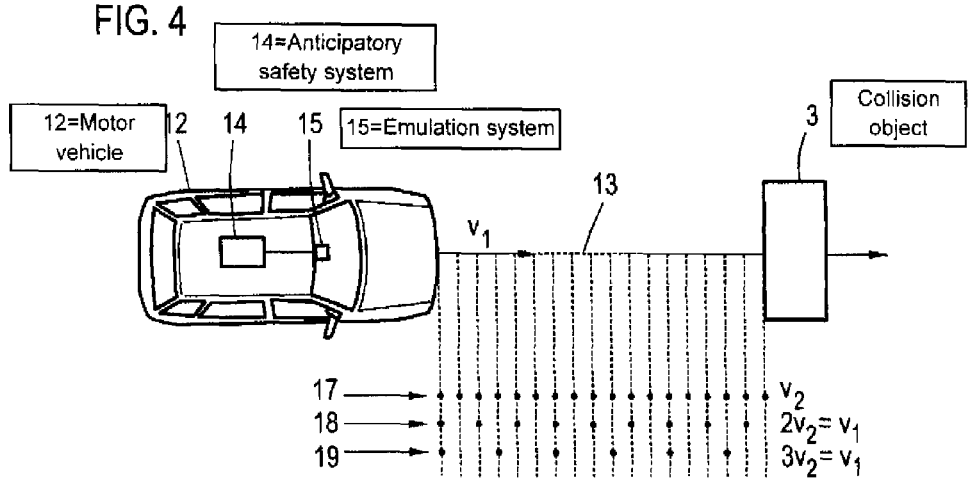
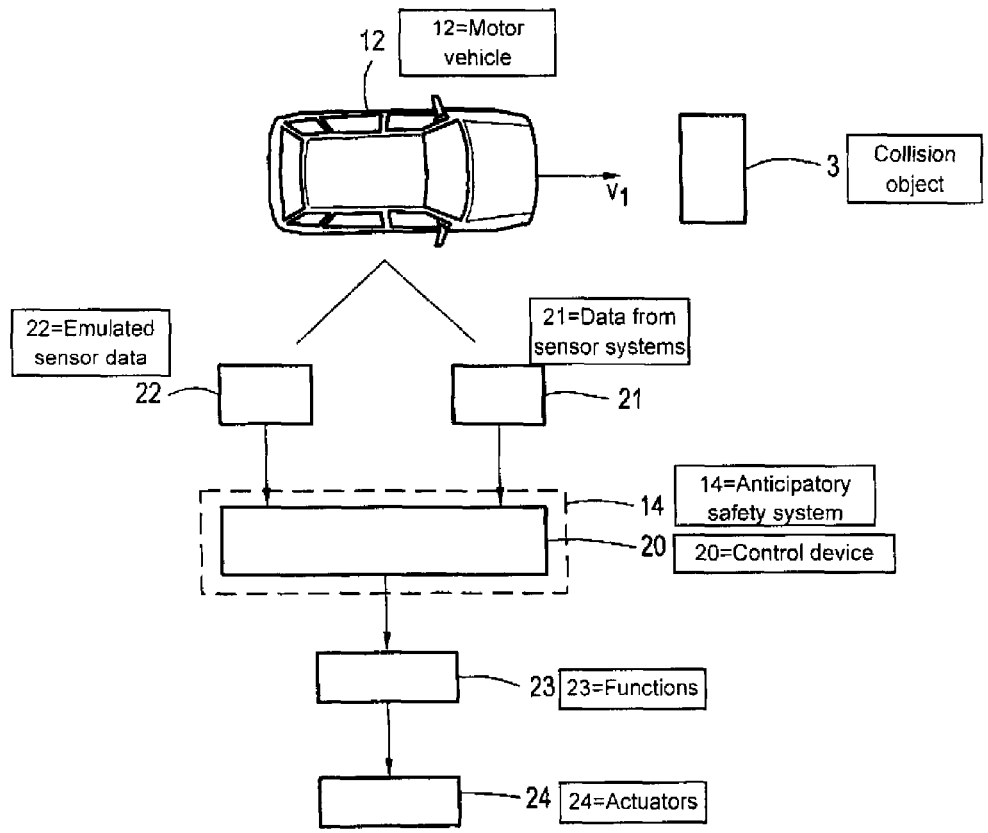

METHOD FOR EMULATING AN ENVIRONMENTAL SENSOR IN A MOTOR VEHICLE AND FOR TESTING AN ANTICIPATORY SAFETY SYSTEM, AND AN EMULATION SYSTEM

CROSS-REFERENCES TO RELATED APPLICATIONS

This application claims the priority of German Patent Application, 102011012961.8-51, pursuant to 35 U.S.C. 119 (a)-(d), the content of which is incorporated herein by reference in its entirety as if fully set forth herein.

BACKGROUND OF THE INVENTION

The present invention relates to a method for emulating an environmental sensor in a motor vehicle in a specified collision situation at a first predetermined speed of the motor vehicle, a method for testing an anticipatory safety system of a motor vehicle in a collision situation, wherein the safety system includes data received from an environmental sensor, in particular via a vehicle bus, and an emulation system for an environmental sensor of the motor vehicle.

The following discussion of related art is provided to assist the reader in understanding the advantages of the invention, and is not to be construed as an admission that this related art is prior art to this invention.

Anticipatory safety systems for motor vehicles are generally known. The environment of the motor vehicle is hereby monitored for potential collision situations by environmental sensors (anticipatory sensors), for example laser scanners, radar sensors, PMD (Photonic Mixer Device), image-producing sensors and the like, for activating with a control device measures that prevent an accident or lessen the severity of an accident. For example, brake interventions can be performed or airbag algorithms can be pre-parameterized, and the like.

To be able to test the anticipatory safety systems, it is known to install the systems in a motor vehicle in addition to the employed environmental sensors used to perform a so-called "crash test", i.e. by intentionally causing a certain defined collision situation. In most cases, this also results in an actual collision, because the actual anticipatory sensor data can only be recorded by the environmental sensors during actual collisions.

Disadvantageously, the installation and integration of the environmental sensors (anticipatory sensors) is expensive, and most motor vehicles tested, for example in crash buildings, lack such environmental sensors. In addition, the anticipatory sensors are mostly destroyed in crash tests, although these sensors may be very expensive prototypes.

It would therefore be desirable and advantageous to obviate prior art shortcomings and to provide an improved method and system for obtaining realistic sensor data from an environmental sensor during a crash test, without requiring installation of the sensor or risking destruction of the sensor.

SUMMARY OF THE INVENTION

According to one aspect of the present invention, a method for emulating an environmental sensor in a motor vehicle in a collision situation includes recording with the environmental sensor to be emulated raw data at a second speed of the motor vehicle which is lower than a predetermined first speed of the motor vehicle at which an actual collision takes place, wherein the motor vehicle used at the second speed is identical or substantially structurally identical to the motor vehicle to be used at the first speed, storing the recorded raw data, downsampling the stored raw data or raw data extrapolated from the stored raw data, and emulating the environmental sensor with the downsampled raw data.

According to an advantageous feature of the present invention, an expensive environmental sensor which is difficult to install is then no longer required; instead, this environmental sensor may be emulated in an actually performed crash test, wherein previously recorded and stored raw data from an actual environmental sensor which are recorded in an identical collision situation, albeit at a significantly slower second speed, form the basis for the emulation. For example, the motor vehicle initially travels the trajectory along the crash course very slowly in the defined collision situation, for example in a crash building, using a structurally substantially identical motor vehicle which has the installed environmental sensor, whereby raw data from the environmental sensor are recorded and stored. Advantageously, the collision may be avoided by braking a short distance, in particular several centimeters, for example 10 cm, before the collision partner, so that there is no risk of damaging the motor vehicle recording the raw data from the actual environmental sensor or even damaging the environmental sensor itself. Very low speeds may be selected as the second speed, for example a speed of 10 km/h. The raw data can still be used even if the actual collision takes place at a higher speed. With the environmental sensor recording data with a defined cycle, for example 20 to 40 ms, more measurement points are available at the lower second speed along the same traveled course than at the higher first speed. According to another advantageous feature of the present invention, the stored and optionally interpolated raw data may be downsampled in order to obtain extremely realistic sensor data also for the specific collision situation of the actual crash test. The ratio of the first speed to the second speed determines the degree of undersampling.

As already described, essentially two possibilities may be contemplated wherein, on one hand, no interpolation may be required and, on the other hand, the stored raw data are interpolated. According to an advantageous feature of the present invention, the first speed may be an integer multiple of the second speed and the stored raw data may be used in downsampled form. In this case, no interpolation is required and the stored raw data can be used directly. For example, if the stored raw data were recorded at a speed of 20 km/h as the second speed and the crash test with the environmental sensor is to be emulated is carried out at a speed of 100 km/h, then each fifth stored raw data point is used as basis for the emulation.

According to an advantageous feature of the present invention, in an alternative embodiment (or with several consecutive crash tests with different first speed), the stored raw data may first be upsampled if the second speed is not an integer multiple of the first speed, wherein the emulation is performed by downsampling the upsampled raw data. Methods for increasing the sampling rates (upsampling) are known, with upsampling essentially corresponding to an interpolation. It may also be feasible to first double the sampling rate if the first speed corresponds to 3.5 times the second speed and to then downsample by a factor of 7, i.e. every seventh value of the upsampled raw data composed of the stored raw data and the interpolated raw data is used. However, it should be noted that other approaches exist for interpolating the stored raw data.

Because the same trajectory is used for recording the raw data with the real environmental sensor that is also used in the actual collision situation, the emulated sensor data correspond realistically to those data that would also be recorded by an actual sensor. Distortions due to the different speeds caused by the finite measurement time are rather small. The emulation therefore produces sensor data which can be regarded as being equivalent to those of an actual installed environmental sensor.

According to an advantageous feature of the present invention, the method according to the invention may also be employed in parallel with several environmental sensors installed in a safety system. A similar approach may also be used in collision situation involving a very slowly traveled relative motion scenario, for example a reconstructed vehicle-vehicle crash test, with two or more collision partners.

According to another advantageous feature of the present invention, the downsampled raw data, which can also be referred to as manipulated raw data, may then be supplied to another arbitrary motor vehicle which is tested in an actual crash test or in the actual collision situation. The control devices of the crashed motor vehicle then receive those signals that would be provided by an environmental sensor (anticipatory sensor) in the respective building scenario or field scenario. The functions of the safety system which access the anticipatory information source can then also be tested in a crash at even higher relative speeds up to close range using realistic measured sensor data.

With the present method, signals for different first speeds can be generated based on the same anticipatory raw data recorded beforehand, allowing testing of functions of a safety system requiring such information in a crash. This not only eliminates the environmental sensors which would be destroyed in a crash test, but also the installation and the expensive and time-consuming integration of the sensors. In this way, a large number of additional test runs at a higher relative speeds can be simulated with a single slow test run performed virtually on the same trajectory in the same collision situation, without destruction of material, which results in a greater coverage of the test space and produces time advantages.

According to an advantageous feature of the present invention, when the data recorded with the environmental sensor are preprocessed, in particular speed-dependent, the raw data may be read out before preprocessing, with the downsampled raw data being preprocessed in the emulation. Frequently, raw data are preprocessed, in particular inside the environmental sensor, before they are processed by a control device, for example the control device of an anticipatory safety system. Additional assumptions, in particular the speed, are already included in these preprocessing steps, which may include, for example, Kalman filtering. In particular with speed dependence, the raw data may advantageously already be read out before preprocessing, because emulation with the method according to the invention takes place from a lower second speed to a higher first speed. Preprocessing may then prevent possible errors, by adapting preprocessing within the context of the emulation for the different first speeds to the first speed.

According to an advantageous feature of the present invention, the environmental sensor may be an image-producing sensor, in particular a camera or a PMD, or a radar sensor or a laser sensor or an ultrasound sensor. The method according to the invention may, of course, also be applied with several sensors, if a safety system is capable of processing the data from several environmental sensors.

The invention also relates to a method for testing an anticipatory safety system of a motor vehicle in a collision situation, wherein the safety system includes a control device receiving data from an environmental sensor, for example a vehicle bus, wherein the control device is characterized in that the environmental sensor is emulated with the aforedescribed method for emulating an environmental sensor in a motor vehicle. With such method, for example crash tests can be performed without necessitating the destruction of expensive environmental sensor materials. The discussions relating to the emulation method according to the invention apply also to the test method according to the invention, producing the aforementioned advantages. Advantageously, the test method according to the invention may be applied to collision situations, meaning crash tests, inside a building as well as in the field.

According to another aspect of the invention, an emulation system for emulating an environmental sensor in a motor vehicle in a collision situation includes a storage device for storing raw data recorded with the environmental sensor to be emulated at a second speed of the motor vehicle which is lower than a predetermined first speed of the motor vehicle traveled for the emulation at which an actual collision takes place or for storing raw data interpolated from the recorded raw data, and a control device for selecting from the stored raw data or from the raw data extrapolated from the stored raw data downsampled raw data. The selected downsampled raw data depend on a ratio of the first speed to the second speed.

Such emulation system may advantageously be used with the test method according to the invention within a motor vehicle participating in the actual crash test, replacing an environmental sensor. For example, such emulation system may be connected via a suitable interface to a vehicle bus, wherein the emulation system can be installed so that it may not even be damaged. The emulation system includes a storage device in which optionally upsampled or otherwise interpolated raw data are stored together with the raw data recorded with the actual sensor, wherein these raw data can be used in downsampled form for emulating the environmental sensor depending on the first speed actually driven along the first trajectory. For this purpose, a control device controls the selection and transmission of the corresponding raw data through downsampling.

According to an advantageous feature of the present invention, the emulation system may further include a preprocessing device for the downsampled raw data and an interface for a vehicle bus, in particular a CAN (Controller Area Network) bus. As already described with reference to the method of the invention, the raw data may be preprocessed, for example speed-dependent or by using other information, before the raw data are transferred to the vehicle bus having an actual environmental sensor. Advantageously, the emulation system may also include a preprocessing device formed, for example, by suitable electronic components and which corresponds to a preprocessing device that would be used with the actual sensor. The emulation system can then be connected to the vehicle bus, replacing the environmental sensor, supplying realistic sensor data at high speeds, without requiring that an environmental sensor is actually installed in the motor vehicle performing the crash test, where an environmental sensor may actually be destroyed.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4 is a schematic diagram illustrating downsampling the raw data, FIG. 5 is a schematic flow diagram of the test method according to the invention.

DETAILED DESCRIPTION OF PREFERRED EMBODIMENTS

Figure 1:
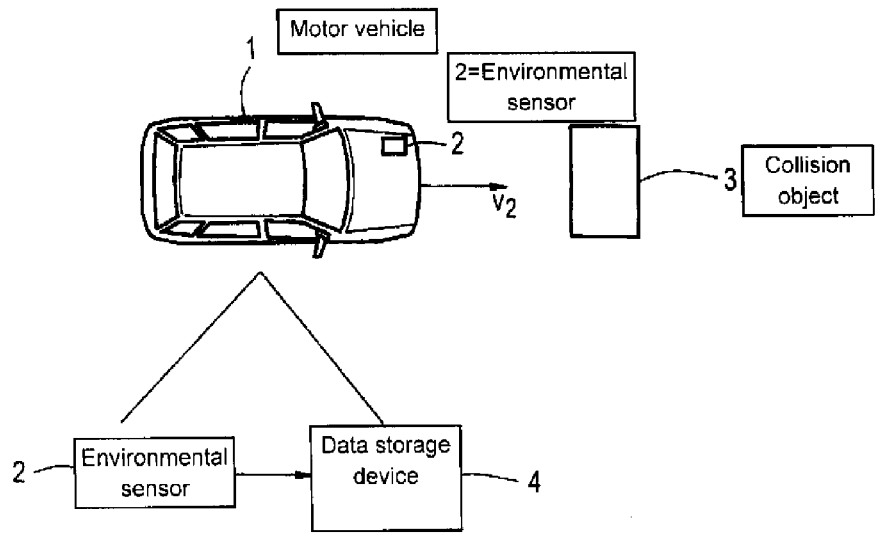
FIG. 1 is a diagram relating to a first step of the method according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The test method according to the invention for an anticipatory safety system of a motor vehicle, which in the present example relates to pre-parameterizing of systems that are activated in a collision, includes also the emulation method according to the invention. According to the basic concept, when a crash test in a predetermined defined collision situation with a defined trajectory of the motor vehicle with the safety system is to be performed at a high first speed, raw data from the environmental sensor to be emulated are first recorded at a second lower speed and thereafter scaled in time, i.e. downsampled, allowing the raw data recorded with the actual sensor at the second speed to be used also at higher first speeds.

Turning now to the drawing, and in particular to FIG. 1, there is shown how the raw data are first recorded. A motor vehicle 1 which is substantially structurally equivalent to the motor vehicle used in the later actual crash test and which includes the real environmental sensor 2 to be emulated, moves towards a collision object 3 along a predetermined trajectory at the low second speed $v_2$, for example 10 km/h. During the entire travel with the speed $v_2$, raw data from the sensor 2 are recorded and stored in a data storage device 4 for raw data. The motor vehicle 1 is braked a short distance before the collision object 3, in particular several centimeters, for example 10 cm, to prevent an actual collision. The motor vehicle 1 and the environmental sensor 2 thus remain undamaged.

Figure 2:
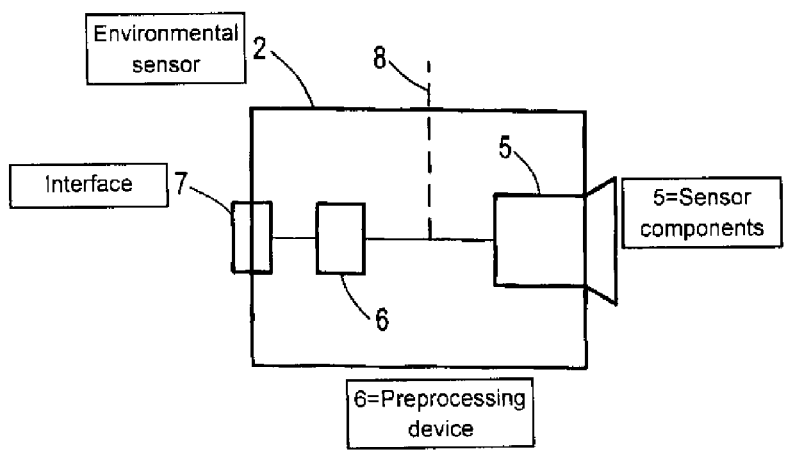
FIG. 2 shows a structure of an employed environmental sensor.

FIG. 2 shows in more detail the structure of the environmental sensor 2. The sensor 2 includes, in addition to the actual sensor components 5, a preprocessing device 6, where the data obtained from the components 5 are preprocessed depending on the speed, for example by Kalman filtering. The preprocessed sensor data can then be supplied via an interface 7 to a vehicle bus, for example a CAN bus. In the illustrated exemplary embodiment of the test method and the emulation method according to the invention, the raw data from the sensor 2 are already read out before the preprocessing device 6, as indicated by the dashed line 8, i.e. before additional information, in particular the second speed $v_2$, can affect the data.

Figure 3:
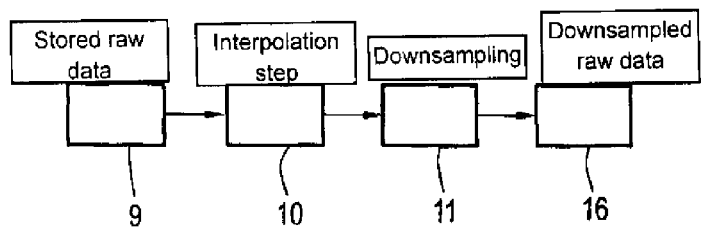
FIG. 3 is a schematic flow diagram of the further process flow of the emulation method according to the present invention.

FIG. 3 shows the further progress of the emulation method according to the invention. If the stored raw data 9 are to be used at a later time for emulating the environmental sensor 2 during a crash test, where the same trajectory is traveled as in the recording according to FIG. 1, then the further procedure is essentially dependent if the first speed is an integer multiple of the second speed. If this is not the case, then an interpolation is required with a step 10 provided only for the situation. The stored raw data are then augmented by the additional interpolated raw data by first increasing the sampling rate from the cycle of the environmental sensor 2 by upsampling, which is necessary for subsequent downsampling commensurate with the first speed.

Preferably, the first speed may be an integer multiple of the second speed, which can be realized in most cases when the second speed is, for example, 10 km/h, in which case the stored, non-augmented raw data 9 can be used, making step 10 unnecessary.

At a step 11, the stored raw data 9 (which are optionally augmented at step 10) are downsampled. This is described in more detail with reference to the diagram in FIG. 4, which shows the motor vehicle 12, which is used for the actual crash test and does not have an environmental sensor 2, on its travel to the collision object 3 at the first speed $v_1$. The trajectory 13 hereby corresponds to the trajectory which the motor vehicle 1 traveled when the raw data were recorded at the second speed $v_2$. The anticipatory safety system 14 to be tested is installed in the motor vehicle 12 and connected via the vehicle bus with an emulation system 15 which will be described in more detail below; the emulation system 15 supplies the downsampled raw data 16 (FIG. 3)—also referred to as manipulated raw data.

The lower part of FIG. 4 illustrates the principle of downsampling. A top row 17 shows points at which the measurement values were recorded at the second speed $v_2$. Because the cycle of the environmental sensor 2 does not change, a smaller number of measurement values are recorded at corresponding positions at the higher first speeds $v_1$, wherein the middle row 18 shows the recording positions at a first speed $v_1$ which corresponds to twice the second speed $v_2$. It is evident that a sensor signal of the environmental sensor 2 can hereby be emulated from the stored raw data by taking into account only every second actual measurement value. Accordingly, when the first speed $v_1$ is three times the second speed $v_2$, only every third raw data point of the stored raw data 9 is used, as shown in the lower row 19.

The represents an equidistant omission (downsampling) of raw data samples of the stored raw data 9. Within the context of the test method according to the invention, the obtained downsampled raw data 16 are now supplied as input to the control device of the anticipatory safety system 14. As seen from the control device of the safety system 14, there is no difference to a vehicle in which the environmental sensor 2 is installed, thus allowing the testing of functions requiring sensor data from the environmental sensor 2.

This will be described more clearly once more in FIG. 5, which shows the main process flow of the test method according to the invention, while the motor vehicle 12 moves at the first speed $v_1$ towards the collision object 3 in a crash test. It is evident that the control device 20 of the anticipatory safety system 14 includes as input data both data 21 from sensors actually installed in the motor vehicle 12 as well as the downsampled emulated sensor data 22 which are processed in the preprocessing device 6, as will be described below. The data 21, 22 are hereby each supplied via an (unillustrated) vehicle bus, in particular a CAN bus, whereby the processed, downsampled, emulated sensor data 22 are supplied by the emulation system 15. The data 21, 22 can now be used to also perform functions 23 requiring the data from the environmental sensor 2. Accordingly, actuators 24, for example air bags, belt tensioners and the like, can then be controlled and preconditioned for the collision with the collision object 3 and hence tested.

New streams of manipulated raw data 16 can then be generated by selecting the raw data samples from the stored raw data 9 depending on the ratio of the first speed $v_1$ to the second speed $v_2$, as would be measured at the higher speed $v_1$, which is accomplished by downsampling. These manipulated, downsampled raw data 16 are then suitably preprocessed to generate the emulated sensor data 22, which are then supplied to the control device 20 via the vehicle bus.

Figure 6:
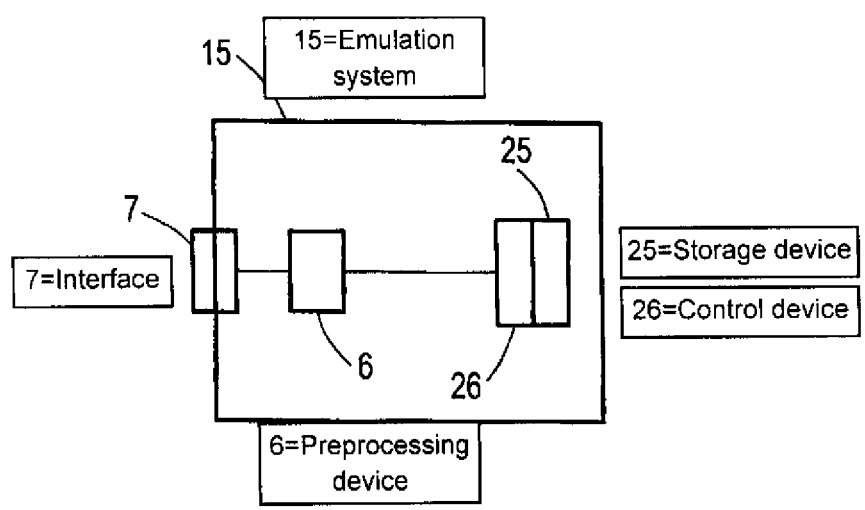
FIG. 6 is an emulation system according to the invention.

As already mentioned, the emulation system 15 according to the invention can be used for this purpose, as illustrated in more detail in FIG. 6. The emulation system 15 includes a storage device 25 for the stored raw data 9 (if applicable, the stored and the interpolated raw data) and a control device 26 which performs downsampling commensurate with the first speed $v_1$. The downsampled raw data 16 are then supplied, as in the sensor 2, to a preprocessing device 6 and forwarded via an interface 7 to the vehicle bus, for example a CAN bus.

The emulation system 15 may be surrounded by a protected housing and/or positioned at a safe location within the motor vehicle 12. It can then be employed undamaged in several crash tests, wherein the emulation system 15 may, for example, be connected for another crash test to the vehicle bus of an additional motor vehicle 12.

It should be noted that this point that the methods and emulation systems according to the invention can of course be realized also with several environmental sensors 2 and/or tests for collision situations with moving collision partners are also feasible.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for emulating an environmental sensor in a first motor vehicle in a collision situation to take place at a predetermined first speed of the first motor vehicle, comprising the steps of:
   driving the first motor vehicle or a second motor vehicle that is substantially identically constructed as the first motor vehicle at a second speed which is lower than the predetermined first speed,
   recording with the environmental sensor to be emulated raw data at the second speed,
   storing the recorded raw data,
   downsampling the stored raw data or raw data extrapolated from the stored raw data, and
   emulating the environmental sensor at the predetermined first speed by using the downsampled raw data.

2. The method of claim 1, wherein the first speed is an integer multiple of the second speed and the stored raw data are downsampled.

3. The method of claim 1, wherein when the second speed is not an integer multiple of the first speed, the stored raw data are first upsampled, with the upsampled raw data being downsampled for the emulation.

4. The method of claim 1, further comprising the steps of:
   reading the raw data recorded with the environmental sensor,
   preprocessing the read raw data,
   preprocessing the downsampled raw data, and
   emulating the environmental sensor with the preprocessed downsampled raw data.

5. The method of claim 4, wherein the raw data are preprocessed speed-dependent.

6. The method of claim 1, wherein the environmental sensor comprises a sensor selected from the group consisting of image-producing sensor, camera, PMD (Photonic Mixer Device), radar sensor, laser sensor and ultrasound sensor.

7. A method for testing an anticipatory safety system of a first motor vehicle in a collision situation to take place at a predetermined first speed of the first motor vehicle, with the safety system comprising a control device receiving data from an environmental sensor,
   wherein the first motor vehicle or a second motor vehicle that is substantially identically constructed as the first motor vehicle is driven at a second speed which is lower than the predetermined first speed,
   wherein the environmental sensor is emulated by
   recording with the environmental sensor to be emulated raw data at the second speed,
   storing the recorded raw data,
   downsampling the stored raw data or raw data extrapolated from the stored raw data, and
   emulating the environmental sensor at the predetermined first speed by using the downsampled raw data.

8. The method of claim 7, wherein the data are received via a vehicle bus.

9. An emulation system for emulating an environmental sensor in a motor vehicle in a collision situation to take place at a predetermined first speed of the motor vehicle, comprising:
   a storage device for storing raw data recorded with the environmental sensor at a second speed of the first motor vehicle which is lower than a predetermined first speed or for storing raw data interpolated from the recorded raw data, and
   a control device for selecting from the stored raw data or from the raw data interpolated from the stored raw data downsampled raw data, with the selected downsampled raw data depending on a ratio of the predetermined first speed to the second speed, wherein the environmental sensor is emulated at the predetermined first speed by using the downsampled raw data.

10. The emulation system of claim 9, further comprising a preprocessing device for preprocessing the downsampled raw data, and an interface for transmitting the preprocessed data from the preprocessing device to a vehicle bus.

11. The emulation system according to claim 10, wherein the vehicle bus is a Controller Area Network (CAN) bus.

* * * * *